Aug. 14, 1962   H. G. ENGLISH ET AL   3,049,028
GOVERNOR CONTROL FOR AUTOMATIC TRANSMISSION
Filed March 25, 1955                             3 Sheets-Sheet 1

H. G. ENGLISH,
G. W. SCHULZ
INVENTORS.

BY E.C. McRae.
J.R. Faulkner.
J. H. Oster.
ATTYS.

Aug. 14, 1962  H. G. ENGLISH ET AL  3,049,028
GOVERNOR CONTROL FOR AUTOMATIC TRANSMISSION
Filed March 25, 1955  3 Sheets-Sheet 2

H.G. ENGLISH,
G.W. SCHULZ
INVENTORS.

BY E.C. McRae.
J.R. Faulkner.
T.H. Oster.
ATTYS.

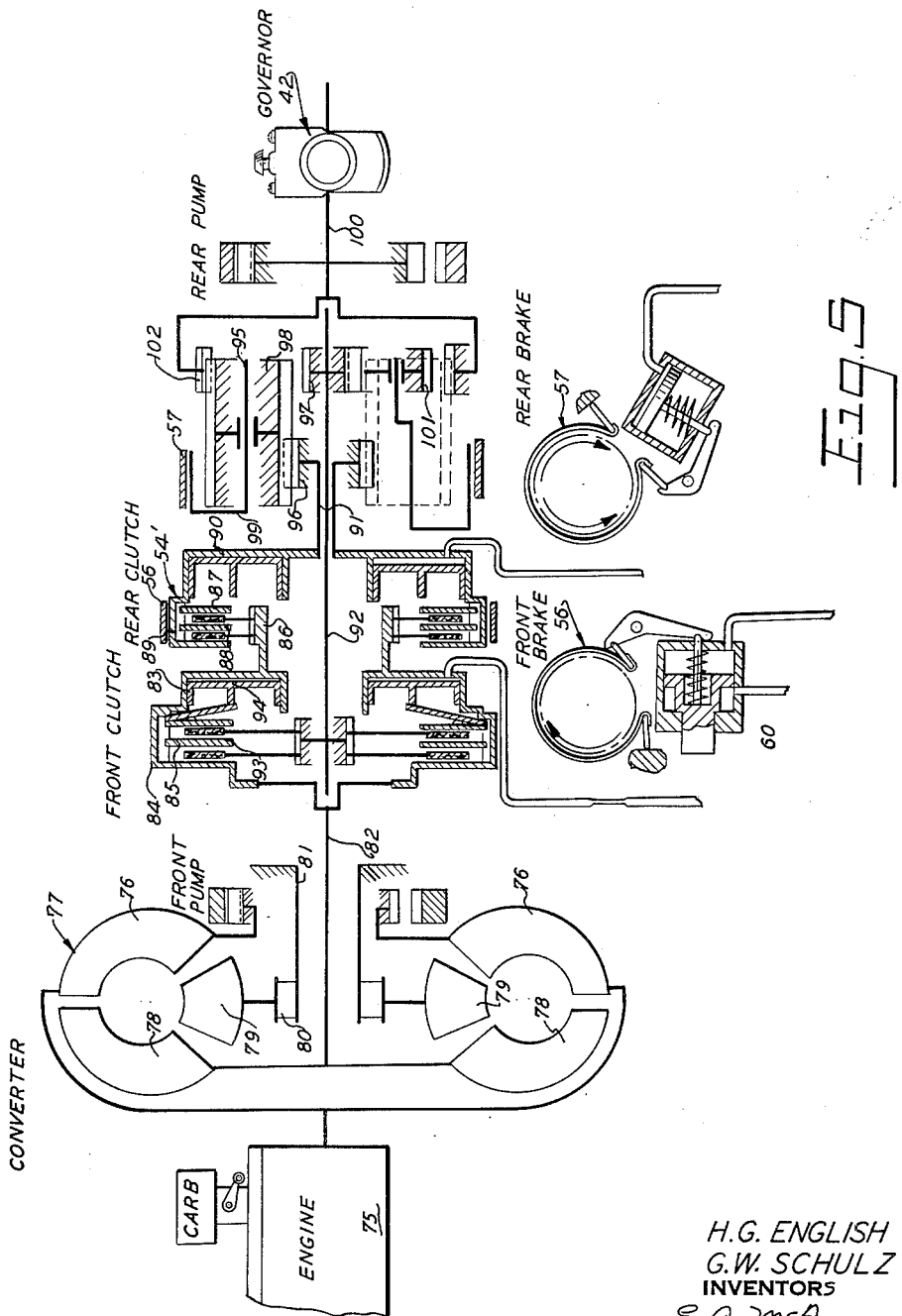

united States Patent Office
3,049,028
Patented Aug. 14, 1962

3,049,028
GOVERNOR CONTROL FOR AUTOMATIC TRANSMISSION
Herdis G. English, Birmingham, and George W. Schulz, Detroit, Mich., assignors to Ford Motor Company, Dearborn, Mich., a corporation of Delaware
Filed Mar. 25, 1955, Ser. No. 496,702
13 Claims. (Cl. 74—752)

This invention relates generally to automatic transmissions for motor vehicles, and has particular reference to a governor control for such transmissions.

An object of the present invention is to provide a compound governor having a two phase operation, providing a relatively rapid pressure build-up rate at low car speeds during the first phase and a slower pressure build-up rate at higher car speeds during the second phase. A governor of this type is suitable for use in connection with an automatic transmission of the type having two automatic shifts, since it provides a sufficiently high governor pressure at low car speeds to provide the proper control for the first automatic shift, as well as providing the proper governor pressure for the second automatic shift.

A further object of the invention is to provide a governor of the type mentioned above which is relatively simple in construction and inexpensive to manufacture and assemble, and which is contained in a single compact unit. The governor is mounted upon the transmission output shaft and all of the mechanism is arranged on one side of the shaft and can be disassembled for service without the necessity of removing the transmission output shaft. The unit is also readily accessible through a cover in the transmission housing to enable the weight to be manually moved if necessary to free a sticky valve.

A further object of the invention is to provide a compound governor of the type mentioned in which the governor valve forms one of the two weights of the unit, thus providing a simplified construction and eliminating the need for a separate valve and weight and an interconnection therebetween.

Other objects and advantages of this invention will be made more apparent as this description proceeds, particularly when considered in connection with the accompanying drawings, wherein:

FIGURE 5 shows in schematic form a power transmission mechanism capable of being used with the control circuit of FIGURE 3.

Figure 2:
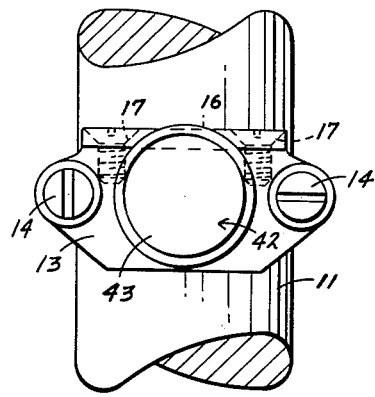
FIGURE 2 is a top plan view of the construction shown in FIGURE 1.
Figure 1:
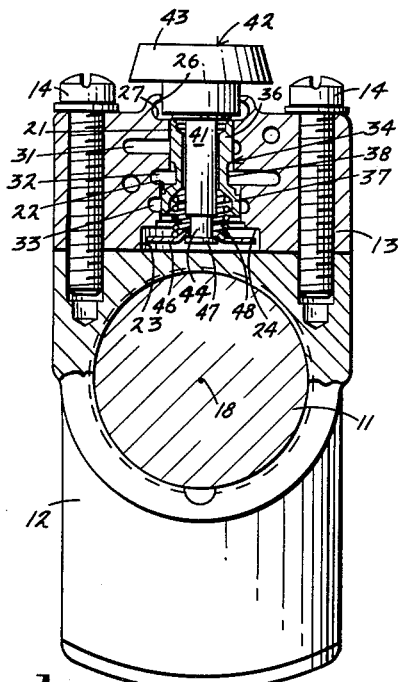
FIGURE 1 is a cross sectional view through the governor of the present invention.

Referring now to the drawing, and particularly to FIGURE 1, the reference character 11 indicates the output shaft of an automatic transmission. A counterweight 12 is keyed or otherwise suitably secured to the output shaft 11 to rotate therewith. A governor body 13 is secured to the counterweight 12 by means of cap screws 14 and is balanced by the weight of the counterweight 12 to form a balanced assembly. A cover 16 is secured to the rearward face of the governor body 13 by means of screws 17.

The governor body 13 is formed with a stepped bore radially aligned with the center 18 of the transmission output shaft 11 and having a small diameter portion 21 and a large diameter portion 22. A counterbore 23 is formed at the radially inner end of the large bore 22, and provides a shoulder 24 at the junction therebetween. A counterbore 26 is formed in the governor body 13 at the radially outer end of the small bore 21, forming a shoulder 27 therebetween.

The stepped bore in the governor body is formed with three axially spaced annular ports 31, 32, and 33. The port 31 communicates with the small bore 21 and supplies line pressure from a suitable pressure source in the transmission. The port 32 communicates with the stepped bore in the governor body at the junction between the small and large portions thereof, and supplies governor pressure to the transmission shift valves. The port 33 communicates with the large diameter bore 22 and is connected to the transmission sump to form an exhaust port.

A governor valve 34 is mounted for reciprocation within the stepped bore in the governor body 13. The valve 34 has a body 36 reciprocable within the small diameter bore 21, and an enlarged head 37 reciprocable within the large diameter bore 22. An annular groove 38 is formed on the periphery of the body port to establish communication between the line pressure, governor pressure and exhaust ports 31, 32 and 33 respectively.

The governor valve 34 is hollow, and slidably receives the shank 41 of the governor weight 42. The weight 42 has an enlarged head 43 projecting radially outwardly of the governor body 13 and having a predetermined mass for governor pressure regulation. The inner portion of the head 43 of the weight 42 is guided within the counterbore 26 in the governor body and is adapted to engage shoulder 27 to limit radially inward movement of the weight.

The radially inner end of the shank 41 of the governor weight is formed with a reduced neck portion 44 receiving a flat retainer 46 held thereon by the enlarged inner end 47 of the shank 41. A compression spring 48 is sleeved over the shank 41 of the governor weight 42 between the retainer 46 and the head 37 of the governor valve 34, and urges the governor valve 34 radially outwardly.

As the vehicle is started the transmission output shaft 11 commences to rotate, and subjects the weight 42, valve 34, retainer 46 and compression spring 48 to centrifugal force. All of this centrifugal force is applied to the valve 34 to tend to move the latter radially outwardly with respect to the axis 18 of the output shaft, the centrifugal force of the weight 42 being transmitted to the valve 34 through the retainer 46 and the compression spring 48. The resulting radially outward movement of the governor valve 34 establishes communication between the line pressure port 31 and the governor pressure port 32 through the annular groove 38 formed on the periphery of the body portion 36 of the valve. The pressure thus built up in the annular groove 38 and the governor pressure port 32 acts upon the enlarged head 37 of the valve, and, due to the differential area between the head 37 and the body 36 of the valve, provides a radially inwardly directed force opposing the centrifugal force. It will be apparent that the valve 34 thus provides a controlled degree of communication between the line pressure and governor pressure ports 31 and 32 to regulate the pressure in governor pressure port 32 and provide a definite pressure, lower than line pressure, for each output shaft speed.

Figure 4:
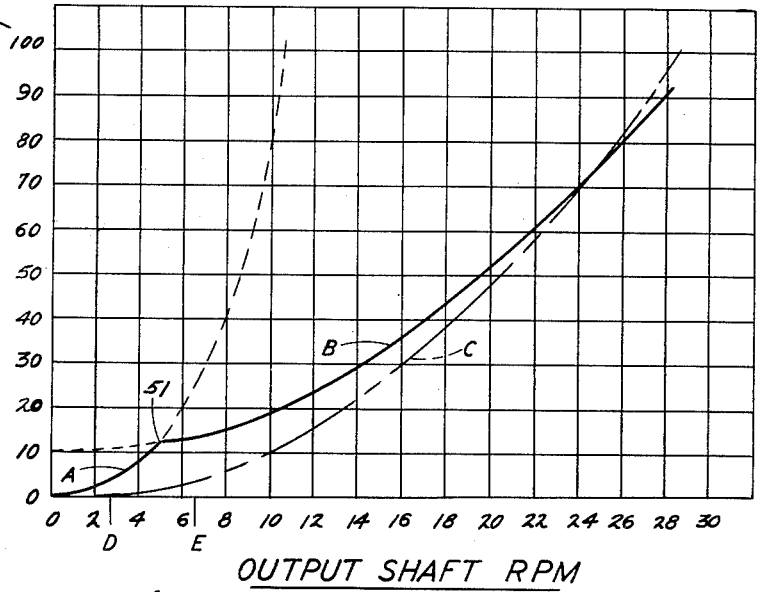
FIGURE 4 is a graph showing the relationship between governor pressure and the transmission output shaft speed.

With the weight, valve, retainer and spring all being subjected to centrifugal force the governor pressure rises rapidly along the curve A shown on the graph of FIGURE 4. As the vehicle speed increases the weight 42 continues to move radially outwardly until the retainer 46 engages the shoulder 24 formed in the governor body between the large diameter bore 22 and the counterbore 23. This occurs at the point marked 51 on the curve A. At all higher speeds, therefore, the weight 42 and the retainer 46 are supported by the governor body 13, and their centrifugal force does not act upon the valve 34.

During the second phase of operation the regulation of the governor pressure is against the centrifugal force of the valve 34 and the spring 48 only, plus the spring load, and accordingly the increase in pressure is at a considerably slower rate. The pressure build-up in this second phase of operation is shown on FIGURE 4 by curve B, and it will be seen that this curve gradually approaches curve C, which represents the curve of a conventional single type governor used for automatic transmission control.

The above described compound governor is applicable for use in connection with a motor vehicle automatic transmission in which two automatic shifts are employed. In such a transmission, the first automatic shift from first to second speeds occurs within a range of relatively low vehicle speeds. One such range is designated by the indicia D—E of FIGURE 4. It will be noted that with a conventional single type governor, producing a pressure curve C, the pressure values within this range are small, making proper control difficult. With the compound governor the pressures during the 1-2 shift are substantially higher and permit proper control.

Figure 3:
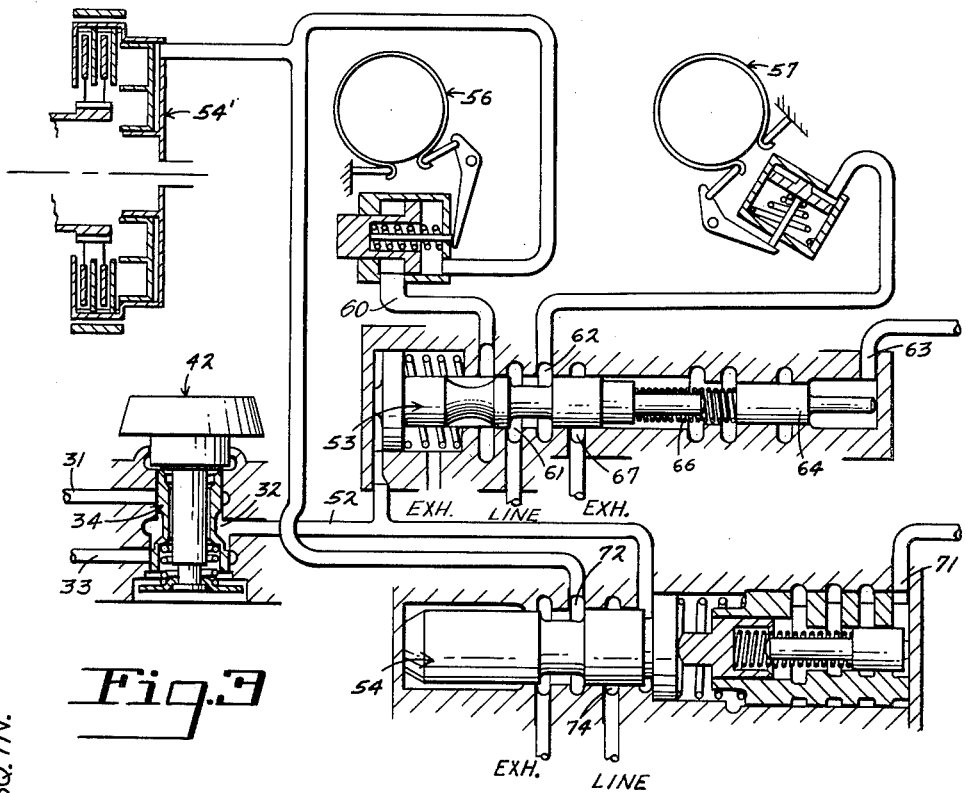
FIGURE 3 is a schematic view of the governor connected to the automatic shift valves of the transmission and to the clutch and servo units therefor.

Reference is now made to FIGURE 3, which diagrammatically illustrates the compound governor and a portion of the control system of the transmission. Pressure from the governor pressure port 32 is supplied through a line 52 to a 1-2 shift valve 53 and a 2-3 shift valve 54. These shift valves are arranged to control a rear clutch 54', a front servo unit 56 and a rear servo unit 57. The clutch and servo units effect the 1-2 and 2-3 shifts of conventional automatic transmission gearing. Such conventional gearing is shown in Patent No. 2,925,159 that is assigned to the assignee of our instant invention.

In first or low speed, the 1-2 shift valve 53 is so positioned as to establish communication between a line pressure port 61 and a control pressure supply port 62 leading to the rear servo unit 57. The front servo unit is disengaged and the rear servo unit is engaged in first speed. Movement of the 1-2 shift valve 53 to the right under actuation of governor pressure regulated by the governor valve is resisted by throttle pressure supplied through port 63 and acting upon a plunger 64 which in turn acts upon the shift valve 53 through a compression spring 66. The throttle pressure is regulated in accordance with throttle position so that a shift from first to second may be effected in the range of 8-35 miles per hour. When the vehicle speed and the governor pressure increase sufficiently to move 1-2 shift valve 53 to the right, communication between the line pressure port 61 and the supply port 62 is broken, and is established between the supply port 62 and the exhaust port 67. This releases the rear servo unit 57. At the same time, communication is established between conduit 60 and line pressure port 61, the former extending to the apply side of the front servo. A shift from first speed to second speed is thus accomplished.

Governor pressure is also supplied to the 2-3 shift valve 54. The movement of the shift valve 54 to the right under governor pressure is similarly resisted by throttle regulated pressure supplied through port 71. When the vehicle speed and governor pressure increase sufficiently to move the 2-3 shift valve 54 to the right, communication will be established between the control port 72 and the line pressure port 74, and the front servo unit 56 will be disengaged as the rear clutch 54' is engaged to effect an automatic shift to third or high speed. This 2-3 shift may be made within the speed range of 15-65 miles per hour depending upon throttle position.

For the purpose of describing one structural environment for the improved governor mechanism of our invention, reference may be made to FIGURE 5. Shown in FIGURE 5 is an engine 75 that is adapted to deliver torque to a pump member 76 for a hydrokinetic torque converter unit 77. This pump member 76 is situated in toroidal fluid flow relationship with respect to a turbine member 78. A torque converter stator is shown at 79 and it is anchored by means of an overrunning clutch 80 to a stationary stator shaft 81.

The turbine member 78 is drivably connected to a turbine shaft 82 that in turn powers a clutch and brake member 83 having an internally splined portion 84. Clutch discs 85 are carried by portion 84. Another portion 86 of the member 83 is externally splined and carries thereon clutch discs 87.

The clutch discs 87 are situated in interdigital relationship with respect to clutch discs 88 that are externally splined to a brake drum 89. A brake band surrounds the drum 89. This band and drum 89 form a part of the previously described servo unit 56.

The discs 87 and 88 define in part the aforementioned clutch 54'. This clutch includes also a fluid pressure cylinder 90 within which is situated an annular piston. When fluid pressure is admitted to the cylinder 90, the piston frictionally engages the discs 87 and 88 to establish a driving connection between member 83 and a sun gear shaft 91.

Another sun gear shaft 92 has splined thereto clutch discs 93 situated in interdigital relationship with respect to discs 85.

The discs 93 and 85 can be urged into frictional engagement by means of an annular piston 94 disposed within a cooperating annular cylinder to which fluid pressure can be distributed for the purpose of applying the clutch. This establishes a driving connection between turbine shaft 82 and sun gear shaft 92.

A planetary gear unit is generally identified by reference numeral 95 and it includes a front sun gear 96 and a rear sun gear 97 connected respectively to shafts 91 and 92. A plurality of planetary pinions 98 is carried by a carrier member 99 that may be braked by means of the previously described brake band servo unit 57. Pinions 98 drivably engage the aforementioned sun gear 96 as well as the planetary ring gear 102, the latter in turn being drivably connected to the power output shaft 100 to which governor mechanism 42 is connected.

Another set of planet gears 101 is carried by the carrier 99 and they drivably engage the planet pinions 98. They also drivably engage sun gear 97.

To establish a low speed driving connection between the shaft 82 and the power output shaft 100, the rear brake and the front clutch are engaged simultaneously. This establishes a low speed ratio in the planetary gear unit.

To establish an intermediate driving speed ratio, the front clutch remains applied and the front brake is applied as the rear brake is released. To condition the transmission for third speed or direct drive operation, both of the brakes are released and the clutches are applied simultaneously. This establishes a direct drive connection between the turbine shaft and the power output shaft.

Reverse drive can be established by releasing the front clutch and applying the rear clutch while simultaneously applying the rear brake.

Our improved governor mechanism 42 is capable of supplying a pressure signal to the shift valves shown in FIGURE 3 that in turn control selectively the distribution of fluid pressure to the servos for the two clutches and the two brakes in order to condition the transmission for operation in its various forward driving speed ratios.

It will be understood that the invention is not to be limited to the exact construction shown and described, but that various changes and modifications may be made without departing from the spirit and scope of the invention, as defined in the appended claims.

What is claimed is:

1. A compound governor for a motor vehicle transmission having a rotatable member and a fluid flow path, comprising a governor body mounted for rotation with said member, a governor valve reciprocably mounted within said governor body and arranged to control said fluid flow path, said valve being hollow, a governor weight having a portion thereof extending through said hollow valve and moveably mounted with respect to said valve, said weight and said valve being situated on the same side of the axis of rotation of said rotatable member, a compression spring between said governor weight and said governor valve to apply the centrifugal force of said weight upon said valve, and a part carried by said governor weight engageable with a portion of said governor body after a predetermined movement of said weight to relieve said governor valve of the centrifugal force of said weight.

2. A compound governor, comprising a governor body mounted for rotation about an axis and having a valve bore formed therein extending radially with respect to said axis, said governor body having inlet and outlet fluid pressure passageways communicating with said valve bore, a hollow governor valve reciprocably mounted within said valve bore and controlling said passageways, a governor weight extending through said hollow valve and projecting beyond the opposite ends thereof, the end of said governor weight projecting beyond the radially outer end of said valve being enlarged to form a mass of predetermined weight, a retainer mounted upon the end of said governor weight extending radially inwardly beyond said valve, a compression spring between said retainer and said valve, and means on said governor body projecting into the path of movement of said retainer to engage said retainer and arrest its movement relative to said governor body after a predetermined radially outward movement of said governor weight, said governor valve regulating fluid pressure supplied thereto from said inlet passageway in accordance with the rotational speed of said governor body about said axis with the initial regulation at relatively low rotational speed providing a relatively rapid pressure build-up in said outlet passageway as the centrifugal force of said governor weight is impressed upon said valve and providing a relatively slow pressure build-up in said outlet passageway at higher rotational speeds after said retainer has engaged the projecting means in said governor body and said governor weight is ineffective to apply its centrifugal force to said valve.

3. In a compound governor for a rotatable member, a governor body mounted for rotation with said member and having a stepped radially extending bore therein, said governor body having a line pressure port, a governor pressure port and an exhaust port all intersecting said bore, a governor valve adapted to control said ports and having a body portion reciprocable in the small diameter portion of said stepped bore and an enlarged head reciprocable in the relatively large portion of said stepped bore, said valve being hollow, and a governor weight having a shank extending through said hollow valve and an enlarged head of predetermined mass integrally formed with said shank and extending beyond the radially outer end of said stepped bore, said shank extending radially inwardly of the radial inner end of said valve, a retainer mounted upon the inwardly extending end of the shank of said weight, a compression spring encircling the shank of said weight between said retainer and the enlarged head of said valve, the stepped bore in said governor body having a shoulder formed therein adapted to be engaged by said retainer after a predetermined radially outward movement of said valve to prevent further radially outward movement of said governor weight to relieve said governor valve of the centrifugal force of said governor weight.

4. The structure defined by claim 3 which is further characterized in that said valve has an annular groove formed on the periphery of the body portion thereof to establish communication between said line pressure and said governor pressure ports and between said governor pressure and said exhaust ports to regulate the pressure in the governor pressure port in accordance with the rotational speed of said member, said regulation being in two phases, namely, an initial relatively low speed phase in which the centrifugal force of the governor weight is applied to the governor valve to cause the governor pressure to raise rapidly and a second relatively high speed phase in which the retainer carried by the governor weight engages the governor body to remove the effect of the centrifugal force of said governor weight from said governor valve to provide a less rapidly increasing governor pressure.

5. The structure defined by claim 4 which is further characterized in that the line pressure port communicates with the small diameter portion of said stepped valve bore, said exhaust port communicates with the large diameter portion of said stepped valve bore, and said governor pressure port communicates with said stepped valve bore at the junction between said small and large diameter portions to apply said governor pressure to the differential area between said valve head and said valve body in a radially inward direction opposite to the radially outward centrifugal force of said governor valve and said governor weight.

6. A compound governor for a motor vehicle transmission having a rotatable member and a fluid flow path, comprising a governor body mounted for rotation with said member, a governor valve mounted within said governor body and arranged to control said fluid flow path, a governor weight moveably mounted with respect to said valve, said governor weight and said governor valve being situated in concentric relationship on one side of the axis of rotation of said rotatable member, spring means between said governor weight and said governor valve for applying the centrifugal force of said weight upon said valve, said governor weight having a portion engageable with a portion of said governor body after a predetermined movement of said weight to relieve said governor valve of the centrifugal force of said weight.

7. A compound governor for a motor vehicle transmission having a rotatable shaft and a fluid flow path, a governor body mounted wholly at one side of the axis of said rotatable shaft for rotation with said shaft, a pair of relatively moveable weights moveably mounted in said governor body in concentric and telescopic relationship on one side of said shaft, one of said weights forming a valve controlling said fluid flow path, spring means between said weights for applying the centrifugal force of the other of said weights upon said one weight, a portion of said other weight engageable with a portion of said governor body after a predetermined movement of said other weight to thereafter permit said one weight to operate independently of said other weight.

8. A compound governor for a motor vehicle transmission having a rotatable shaft, comprising a governor body mounted for rotation with said shaft, said governor body having a valve bore formed therein and inlet and outlet fluid passageways communicating with said bore, said valve bore extending radially of said shaft, a valve slidably mounted in said bore and having differential areas exposed to the fluid pressure from said inlet passageway to exert a force upon said valve in a direction radially toward the axis of said shaft and opposite to the centrifugal force upon said valve resulting from rotation of said shaft, a governor weight mounted for radial movements relative to said valve and to said governor body, said governor weight and said valve having concentrically related portions, spring means between said valve and said governor weight for transferring the centrifugal force upon said weight to said valve, said governor weight having a portion engageable with a portion of said governor body after a predetermined radially outward movement to relieve said valve of the centrifugal force of said weight.

9. The structure defined by claim 8 which is further characterized in that said valve and said governor weight are both located wholly on the same side of the axis of said rotatable shaft so that the centrifugal force upon said valve and a centrifugal force on said weight are additive during low rotational speeds of said shaft prior to engagement of said governor weight with said governor body portion.

10. A compound governor for a motor vehicle transmission having a rotatable shaft, a governor body located wholly on one side of the axis of said rotatable shaft for rotation with said shaft, said governor body having a radially extending valve bore, a line pressure passageway, a governor pressure passageway, and an exhaust passageway all communicating with said valve bore, a valve reciprocably mounted within said valve bore and having differential area surfaces exposed to fluid pressure from said line pressure passageway to exert a force upon said valve radially toward the axis of said rotatable shaft and opposite to the centrifugal force upon said valve resulting from its weight and the rotation of said shaft, a weighted member moveably mounted with respect to said valve and to said governor body, said weighted member and said valve being situated wholly on one side of said shaft and having concentrically related portions, means interconnecting said weighted member and said valve for transferring the centrifugal force of said weighted member to said valve, and means anchoring said weighted member to said governor body after a predetermined radially outward movement to limit the centrifugal force upon said valve to that resulting from the weight of the valve alone.

11. The structure defined by claim 10 which is further characterized in that said valve has a small diameter portion and a large diameter portion and is formed with an annular groove between said portions to provide surfaces of different areas exposed to fluid pressure from the line pressure passageway, the means interconnecting said valve and weighted member comprising a compression coil spring acting directly on said valve.

12. A compound governor for a motor vehicle transmission having a rotatable shaft, comprising a governor body mounted for rotation with said shaft, said governor body having a valve bore formed therein and inlet and outlet fluid passageways communicating with said bore, said valve bore extending radially of said shaft, a valve slidably mounted in said bore and having differential areas exposed to the fluid pressure from said inlet passageway to exert a force upon such valve in a direction radially toward the axis of said shaft and opposite to the centrifugal force upon said valve resulting from the rotation of said shaft, a governor weight mounted for radial movement relative to said valve and to said governor body, said governor weight and said valve having concentrically related portions, and spring means between said valve and said governor weight for transferring the centrifugal force upon said weight to said valve, said governor weight having a portion engageable with a portion of said governor body after a predetermined radially outward movement to relieve said valve of the centrifugal force of said weight, said valve and said governor weight both being located wholly on the same side of the axis of said rotatable shaft so that the centrifugal force upon said valve and the centrifugal force on said weight are additive during low rotational speeds of said shaft prior to engagement of said governor weight with said governor body portion, said valve being hollow and said governor weight having a stem extending concentrically within said hollow valve, a radially inner end of said stem having a part engageable with a portion of said governor body to arrest radially outward movement of said governor weight.

13. In a transmission mechanism, the combination of a drive shaft, a driven shaft, means for providing low and intermediate and high speed power trains between said shafts, a control element for causing a shift from the low speed power train to the intermediate speed power train and having a low speed position and an intermediate drive position, a second control element for causing a shift from said intermediate speed power train to said high speed power train and having an intermediate drive position and a high speed position, and a hydraulic governor driven by one of said shafts for providing a fluid governor pressure on each of said control elements tending to move the control element from its relatively low speed position to its relatively high speed position, said governor comprising a valve substantially radially disposed with respect to and carried by said one shaft, said valve having a land uncovering a port to thereby transmit fluid pressure through the valve to said two control elements and having another land subject to the fluid pressure applied to said control elements tending to move said land across said first-named port to close the latter, a weight carried by said valve, and a spring effectively disposed between said valve and weight and allowing radially outward movement of said weight under the action of centrifugal force with respect to said valve and transmitting centrifugal force on the weight to the valve to move it to uncover said port.

References Cited in the file of this patent

UNITED STATES PATENTS

| | | |
|---|---|---|
| 2,378,158 | Roche | June 12, 1945 |
| 2,406,087 | Mallory | Aug. 20, 1946 |
| 2,697,363 | Sheppard | Dec. 21, 1954 |
| 2,876,784 | Adams | Mar. 10, 1959 |